US005566609A

United States Patent [19]

Kirschner

[11] Patent Number: 5,566,609
[45] Date of Patent: Oct. 22, 1996

[54] SHOPPING CART CLIPBOARD AND COUPON HOLDER

[76] Inventor: Suzanne Kirschner, 1120 Ashbridge Rd., Bryn Mawr, Pa. 19010

[21] Appl. No.: 562,402

[22] Filed: Nov. 24, 1995

[51] Int. Cl.$^6$ ................................................ A47B 23/00
[52] U.S. Cl. .................................... 108/42; 280/33.992
[58] Field of Search .......................... 108/42, 44, 26, 108/28, 43; 280/33.992; 224/273, 275

[56] References Cited

U.S. PATENT DOCUMENTS

| | | | |
|---|---|---|---|
| 292,219 | 4/1884 | Anthony | 108/43 |
| 2,476,620 | 7/1949 | Nichols | 108/43 X |
| 4,034,539 | 7/1977 | Economy | 280/33.992 X |
| 4,274,567 | 6/1981 | Sawyer | 280/33.992 X |
| 4,643,280 | 2/1987 | Hensley | 108/44 X |
| 4,702,402 | 10/1987 | Ferri | 280/33.992 X |
| 4,852,498 | 8/1989 | Judd | 108/43 |
| 5,002,215 | 3/1991 | Gregoire | 280/33.992 X |
| 5,004,252 | 4/1991 | Kraper | 280/33.992 |
| 5,176,392 | 1/1993 | Graebe, Jr. | 280/33.992 |
| 5,388,530 | 2/1995 | Jacobus | 108/43 |

*Primary Examiner*—Jose V. Chen

[57] ABSTRACT

A shopping cart clipboard and coupon holder comprised of a center portion having an upper cart securement portion extending outwardly therefrom and a lower cart securement portion therein adapted for coupling with a shopping cart bar. A left portion is hingedly coupled with the center portion. The left portion has a cart securement portion extending outwardly therefrom adapted for coupling with a shopping cart bar. A coupon receiving portion is hingedly coupled with the center portion.

3 Claims, 3 Drawing Sheets

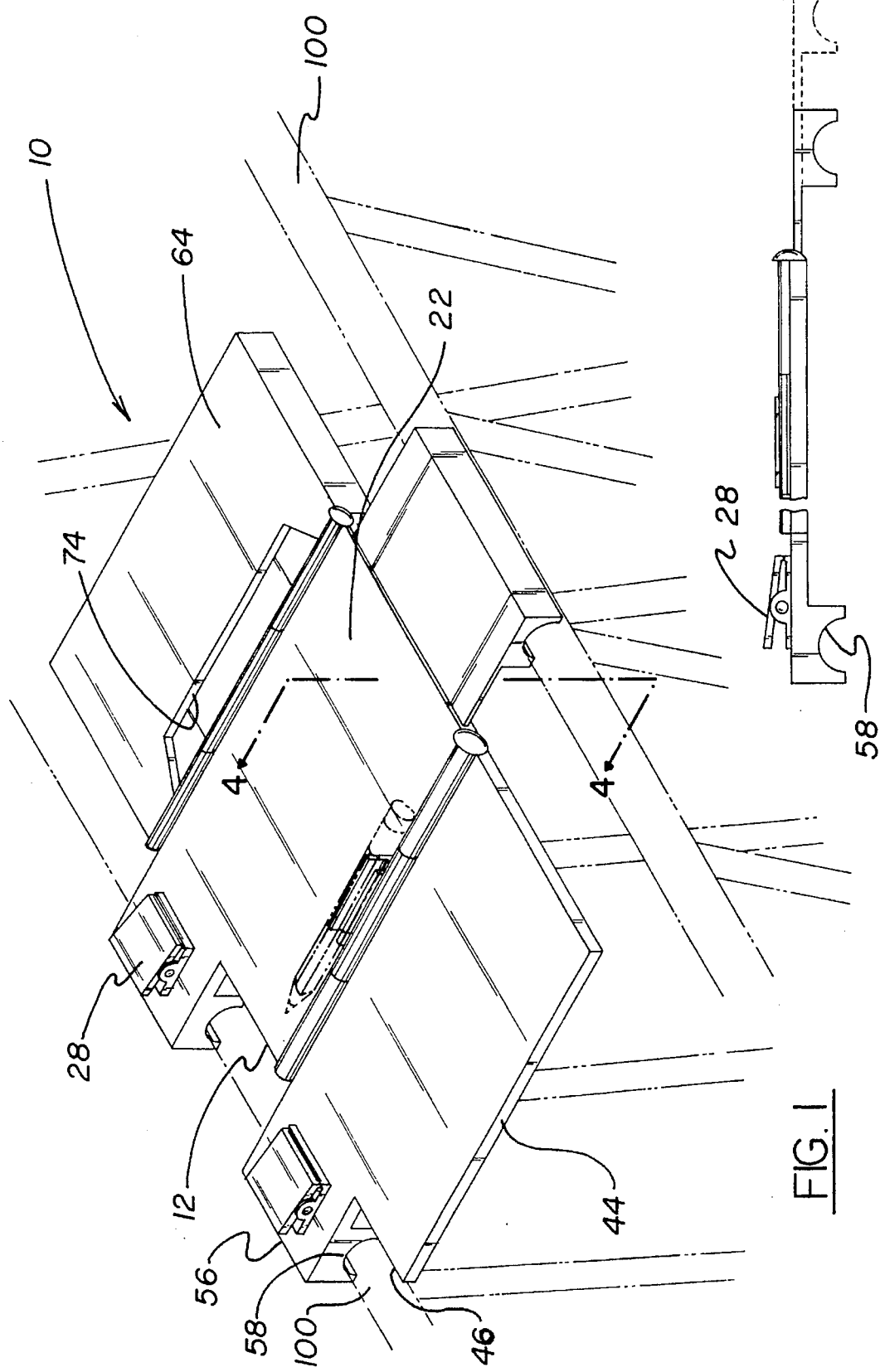

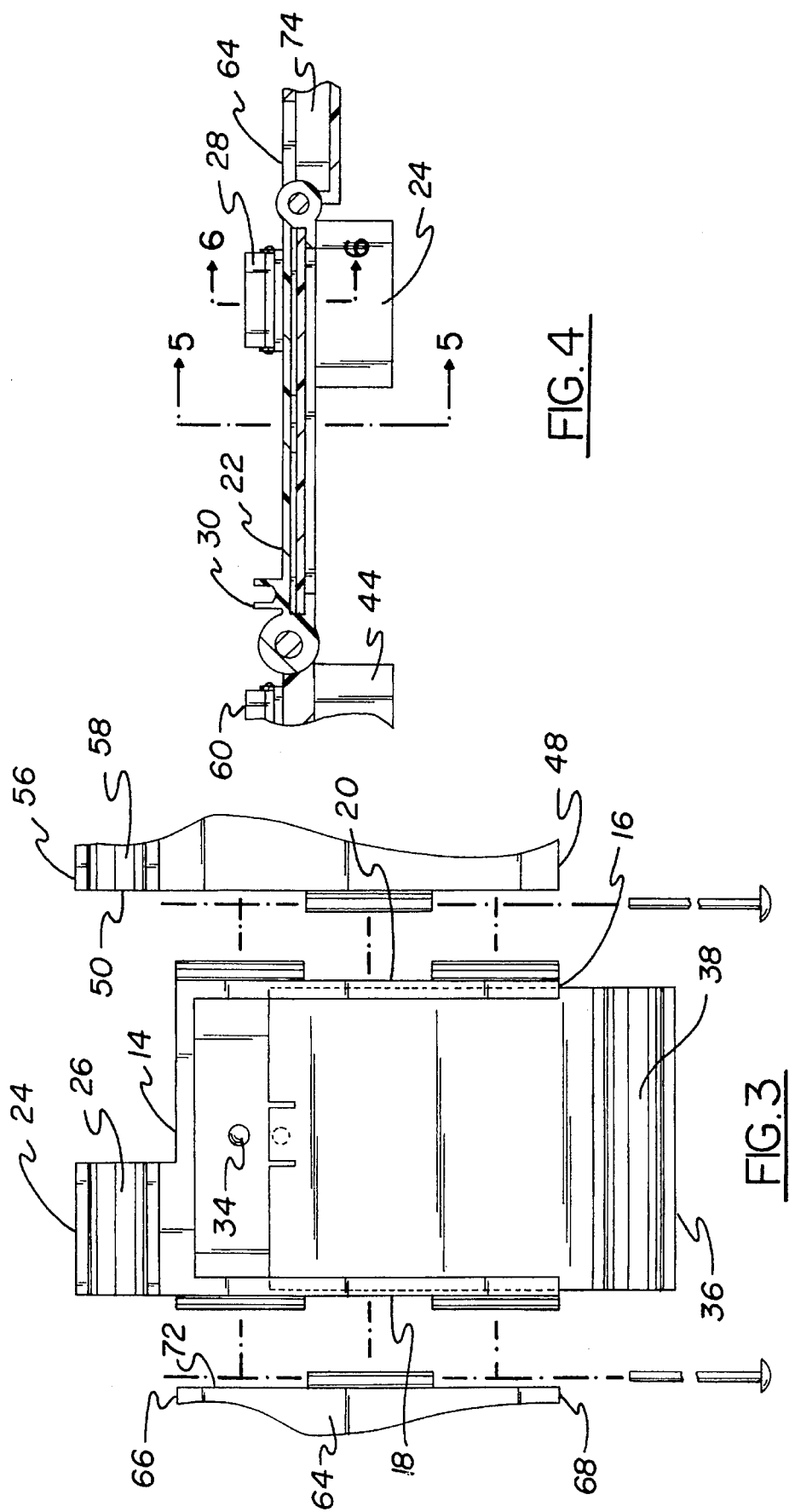

SHOPPING CART CLIPBOARD AND COUPON HOLDER

BACKGROUND OF THE INVENTION

1. Field of the Invention

The present invention relates to a shopping cart clipboard and coupon holder and more particularly pertains to temporarily mounting to a shopping cart for holding shopping lists and coupons with a shopping cart clipboard and coupon holder.

2. Description of the Prior Art

The use of shopping cart clipboards is known in the prior art. More specifically, shopping cart clipboards heretofore devised and utilized for the purpose of retaining miscellaneous items used while shopping are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,743,050 to Small discloses a shopping cart clipboard.

U.S. Pat. No. Des. 318,881 to Chase discloses the ornamental design for a combined clipboard and writing instrument for a shopping cart.

U.S. Pat. No. 4,423,888 to Addison discloses a store cart with clipboard item-retention means.

U.S. Pat. No. Des. 349,130 to Nigris et al. discloses the ornamental design for a clipboard for a shopping cart push bar.

U.S. Pat. No. Des. 313,629 to Hoffman discloses the ornamental design for a clipboard for a shopping cart push bar.

U.S. Pat. No. Des. 301,489 to Aquila et al. discloses the ornamental design for a clipboard for shopping cart push bar.

While these devices fulfill their respective, particular objective and requirements, the aforementioned patents do not describe a shopping cart clipboard and coupon holder for temporarily mounting to a shopping cart for holding shopping lists and coupons.

In this respect, the shopping cart clipboard and coupon holder according to the present invention substantially departs from the conventional concepts and designs of the prior art, and in doing so provides an apparatus primarily developed for the purpose of temporarily mounting to a shopping cart for holding shopping lists and coupons.

Therefore, it can be appreciated that there exists a continuing need for new and improved shopping cart clipboard and coupon holder which can be used for temporarily mounting to a shopping cart for holding shopping lists and coupons. In this regard, the present invention substantially fulfills this need.

SUMMARY OF THE INVENTION

In the view of the foregoing disadvantages inherent in the known types of shopping cart clipboards now present in the prior art, the present invention provides an improved shopping cart clipboard and coupon holder. As such, the general purpose of the present invention, which will be described subsequently in greater detail, is to provide a new and improved shopping cart clipboard and coupon holder and method which has all the advantages of the prior art and none of the disadvantages.

To attain this, the present invention essentially comprises a center portion having an upper edge, a lower edge, a right edge, and a left edge. The center portion includes a planar surface. The upper edge has an upper cart securement portion extending outwardly therefrom. The upper cart securement portion includes a recessed lower surface adapted for coupling with a shopping cart bar. An upper surface of the upper cart securement portion has a spring biased clip secured thereto. The planar surface has an implement securement clip secured thereto. The lower edge has a recess formed therein. The recess has a plurality of rounded recesses formed in an upper surface thereof. The recess slidably receives a lower cart securement portion therein. The lower cart receiving portion includes a recessed lower surface adapted for coupling with a shopping cart bar. The lower cart receiving portion has a rounded protrusion on an upper end thereof adapted for selective coupling with one of the plurality of rounded recesses to prevent sliding of the lower cart receiving portion out of the center portion. The device includes a left portion having an upper edge, a lower edge, a right edge, a left edge, and a planar surface. The right edge is hingedly coupled with the left edge of the center portion. The upper edge has a cart securement portion extending outwardly therefrom. The cart securement portion includes a recessed lower surface adapted for coupling with a shopping cart bar. An upper surface of the cart securement portion has a spring biased clip secured thereto. The device includes a coupon receiving portion having an upper edge, a lower edge, a right edge, and a left edge. The left edge is hingedly coupled with the right edge of the center portion. The right edge has a coupon receiving recess formed therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shopping cart clipboard and coupon holder which has all the advantages of the prior art shopping cart clipboards and none of the disadvantages.

It is another object of the present invention to provide a new and improved shopping cart clipboard and coupon holder which may be easily and efficiently manufactured and marketed.

It is a further object of the present invention to provide a new and improved shopping cart clipboard and coupon holder which is of durable and reliable construction.

An even further object of the present invention is to provide a new and improved shopping cart clipboard and coupon holder which is susceptible of a low cost of manufacture with regard to both materials and labor, and which accordingly is then susceptible of low prices of sale to the consuming public, thereby making such a shopping cart clipboard and coupon holder economically available to the buying public.

Still yet another object of the present invention is to provide a new and improved shopping cart clipboard and coupon holder which provides in the apparatuses and methods of the prior art some of the advantages thereof, while simultaneously overcoming some of the disadvantages normally associated therewith.

Even still another object of the present invention is to provide a new and improved shopping cart clipboard and coupon holder for temporarily mounting to a shopping cart for holding shopping lists and coupons.

Lastly, it is an object of the present invention to provide a new and improved shopping cart clipboard and coupon holder comprised of a center portion having an upper cart securement portion extending outwardly therefrom and a lower cart securement portion therein adapted for coupling with a shopping cart bar. A left portion is hingedly coupled with the center portion. The left portion has a cart securement portion extending outwardly therefrom adapted for coupling with a shopping cart bar. A coupon receiving portion is hingedly coupled with the center portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the shopping cart clipboard and coupon holder constructed in accordance with the principles of the present invention.

FIG. 2 is a side elevation view of the present invention.

FIG. 3 is a bottom view of the center portion of the present invention.

FIG. 4 is a cross-sectional view as taken along line 4—4 of FIG. 1.

The same reference numerals refer to the same parts through the various Figures.

DESCRIPTION OF THE PREFERRED EMBODIMENT

Figure 6:
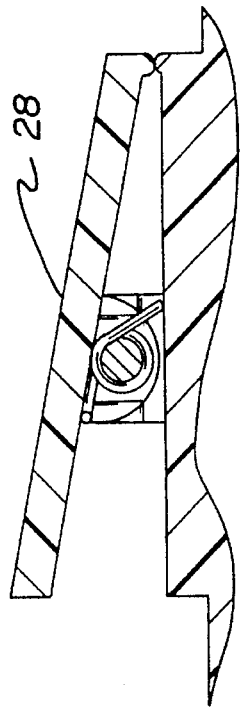
FIG. 6 is a cross-sectional view as taken along line 6—6 of FIG. 4.
Figure 5:
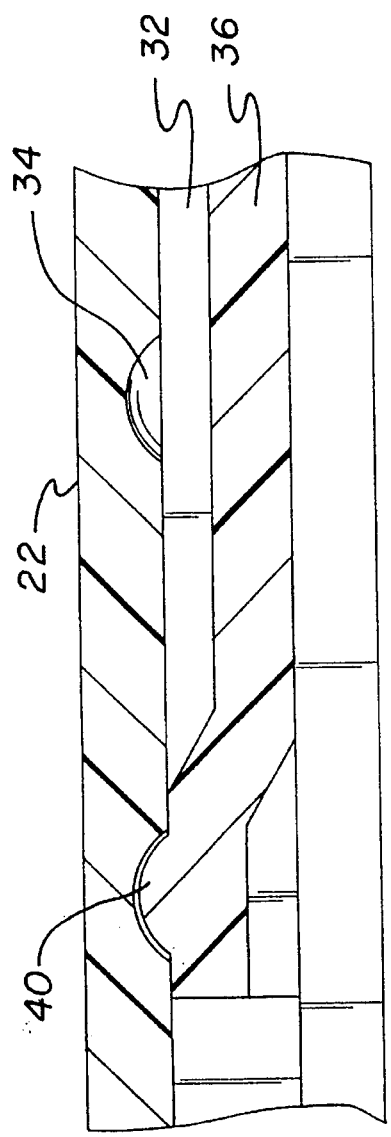
FIG. 5 is a cross-sectional view as taken along line 5—5 of FIG. 4.
Figure 7:
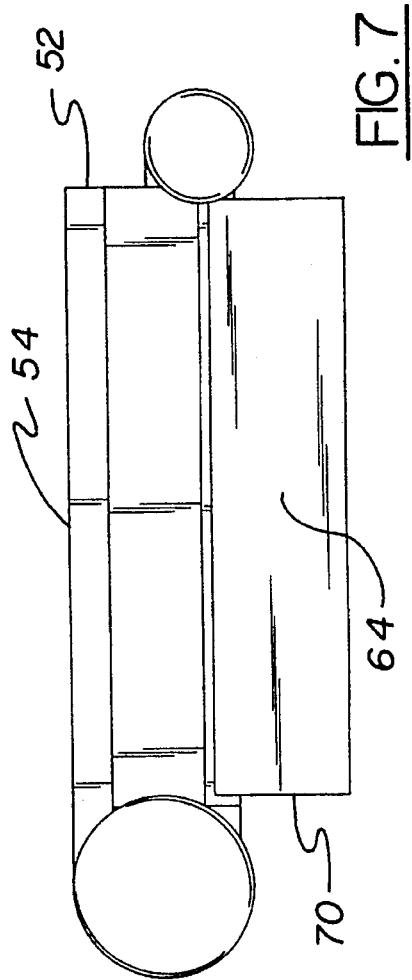
FIG. 7 is a front elevation view of the present invention in a folded configuration.

With reference now to the drawings, and in particular, to Figure's 1–7 thereof, the preferred embodiment of the new and improved shopping cart clipboard and coupon holder embodying the principles and concepts of the present invention and generally designated by the reference number 10 will be described.

Specifically, it will be noted in the various Figures that the device relates to a new and improved shopping cart clipboard and coupon holder for temporarily mounting to a shopping cart for holding shopping lists and coupons. In its broadest context, the device consists of a center portion, a left portion, and a coupon receiving portion. Such components are individually configured and correlated with respect to each other so as to attain the desired objective.

The device 10 includes a center portion 12 having an upper edge 14, a lower edge 16, a right edge 18, and a left edge 20. The center portion 12 includes a planar surface 22. The upper edge 14 has an upper cart securement portion 24 extending outwardly therefrom. The upper cart securement portion 24 includes a recessed lower surface 26 adapted for coupling with a shopping cart bar 100. An upper surface of the upper cart securement portion 24 has a spring biased clip 28 secured thereto. The spring biased clip 28 can be used to hold a shopping list that a shopper can easily check to make sure that they have all items that they need. The planar surface 22 has an implement securement clip 30 secured thereto. The implement securement clip 30 is used to hold a pen or pencil therein. The lower edge 16 has a recess 32 formed therein. The recess 32 has a plurality of rounded recesses 34 formed in an upper surface thereof. The recess 32 slidably receives a lower cart securement portion 36 therein. The lower cart securement portion 36 includes a recessed lower surface 38 adapted for coupling with a shopping cart bar 100. The lower cart securement portion 36 has a rounded protrusion 40 on an upper end thereof adapted for selective coupling with one of the plurality of rounded recesses 34 to prevent sliding of the lower cart securement portion 36 out of the center portion 12. The center portion 12 forms a small desk when secured between the shopping cart bars 100.

The device 10 includes a left portion 44 having an upper edge 46, a lower edge 48, a right edge 50, a left edge 52, and a planar surface 54. The right edge 50 is hingedly coupled with the left edge 20 of the center portion 12. The upper edge 46 has a cart securement portion 56 extending outwardly therefrom. The cart securement portion 56 includes a recessed lower surface 58 adapted for coupling with a shopping cart bar 100. An upper surface of the cart securement portion 56 has a spring biased clip 60 secured thereto. The spring biased clip 60 could be used to hold the shopping list or other item such as calculator. The left portion 44 when secured between the shopping cart bars 100 provides added desk space for the device 10. When the device 10 is not in use, the left portion 44 is folded over the center portion 12.

The device 10 includes a coupon receiving portion 64 having an upper edge 66, a lower edge 68, a right edge 70, and a left edge 72. The left edge 72 is hingedly coupled with the right edge 18 of the center portion 12. The right edge 70 has a coupon receiving recess 74 formed therein. The coupon receiving portion 64 hangs down from the center portion 12 when in use. When the device 10 is not in use, the coupon receiving portion 64 is folded beneath the center portion 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A shopping cart clipboard and coupon holder for temporarily mounting to a shopping cart for holding shopping lists and coupons comprising, in combination:

a center portion having an upper edge, a lower edge, a right edge, and a left edge, the center portion including a planar surface, the upper edge having an upper cart securement portion extending outwardly therefrom, the upper cart securement portion including a recessed lower surface adapted for coupling with a shopping cart bar, an upper surface of the upper cart securement portion having a spring biased clip secured thereto, the planar surface having an implement securement clip secured thereto, the lower edge having a recess formed therein, the recess having a plurality of rounded recesses formed in an upper surface thereof, the recess slidably receiving a lower cart securement portion therein, the lower cart securement portion including a recessed lower surface adapted for coupling with a shopping cart bar, the lower cart securement portion having a rounded protrusion on an upper end thereof adapted for selective coupling with one of the plurality of rounded recesses to prevent sliding of the lower cart securement portion out of the center portion;

a left portion having an upper edge, a lower edge, a right edge, a left edge, and a planar surface, the right edge being hingedly coupled with the left edge of the center portion, the upper edge having a cart securement portion extending outwardly therefrom, the cart securement portion including a recessed lower surface adapted for coupling with a shopping cart bar, an upper surface of the cart securement portion having a spring biased clip secured thereto;

a coupon receiving portion having an upper edge, a lower edge, a right edge, and a left edge, the left edge being hingedly coupled with the right edge of the center portion, the right edge having a coupon receiving recess formed therein.

2. A shopping cart clipboard and coupon holder comprising:

a center portion having an upper cart securement portion extending outwardly therefrom and a cart securement portion therein adapted for coupling with a shopping cart bar, a lower edge of the center portion having a recess formed therein, the recess slidably receiving the lower cart securement portion therein, the lower cart securement portion including a recessed lower surface adapted for coupling with the shopping cart bar;

a left portion hingedly coupled with the center portions, the left portion having a cart securement portion extending outwardly therefrom adapted for coupling with a shopping cart bar;

a coupon receiving portion hingedly coupled with the center portion.

3. The holder as set forth in claim 2 wherein the recess of the center portion having a plurality of rounded recesses formed in an upper surface thereof, the lower cart securement portion having a rounded protrusion on an upper end thereof adapted for selective coupling with one of the plurality of rounded recesses to prevent sliding of the lower cart securement portion out of the center portion.

\* \* \* \* \*